(12) United States Patent
Ohmi et al.

(10) Patent No.: US 6,257,270 B1
(45) Date of Patent: *Jul. 10, 2001

(54) FLUID CONTROL DEVICE

(75) Inventors: Tadahiro Ohmi, 2-1-17-301, Komegafukuro, Aoba-ku, Sendai-shi, Miyagi (JP); Keiji Hirao, Osaka (JP); Yukio Minami, Osaka (JP); Michio Yamaji, Osaka (JP); Takashi Hirose, Osaka (JP); Nobukazu Ikeda, Osaka (JP)

(73) Assignees: Tadahiro Ohmi, Sendai; Fujikin Incorporated, Osaka, both of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/389,475

(22) Filed: Sep. 3, 1999

Related U.S. Application Data

(63) Continuation of application No. 08/853,347, filed on May 8, 1997, now Pat. No. 5,975,112.

(30) Foreign Application Priority Data

May 10, 1996 (JP) .................................................. 8-116204

(51) Int. Cl.[7] .................................................. F16K 11/20
(52) U.S. Cl. .................................... 137/240; 137/606
(58) Field of Search ................................ 137/606, 607, 137/597, 240

(56) References Cited

U.S. PATENT DOCUMENTS

| 462,966 | 11/1891 | Dodd | 137/606 X |
|---|---|---|---|
| 1,525,393 | 2/1925 | Jernatowski | 137/606 |
| 3,797,524 | 3/1974 | Sanelli | 137/606 |
| 4,168,724 | 9/1979 | Graffunder et al. | 137/606 |
| 4,558,845 | 12/1985 | Hunkapillar | 137/606 X |
| 4,741,354 | 5/1988 | DeMild | 137/240 |
| 4,768,543 | 9/1988 | Wienke et al. | . |
| 4,903,722 | 2/1990 | Joseph et al. | 137/209 |
| 5,137,047 | 8/1992 | George | 137/240 |
| 5,183,072 | 2/1993 | Pengler | 137/113 |
| 5,368,062 | 11/1994 | Okumura et al. | 137/240 |
| 5,476,118 | 12/1995 | Yokoyama | . |
| 5,975,112 | * 11/1999 | Ohmi et al. | 137/606 |

FOREIGN PATENT DOCUMENTS

| 0 429 411 | 5/1991 | (EP) . |
|---|---|---|
| 0 429 411 A2 | 5/1991 | (EP) . |
| 0 619 450 A1 | 10/1994 | (EP) . |
| 0 751 301 A2 | 1/1997 | (EP) . |
| 0 806 573 A2 | 11/1997 | (EP) . |
| 0 816 731 A2 | 1/1998 | (EP) . |
| 0 288 931 | 11/1999 | (EP) . |
| WO 98/02684 | 1/1998 | (WO) . |

OTHER PUBLICATIONS

Patent Abstracts of Japan, vol. 96, No. 5, May 31, 1996 & JP 08 005000 A (Fujikin:KK), Jan. 12, 1996.
Patent Abstracts of Japan, vol. 12, No. 286 (M–727), Aug. 5, 1988 & JP 63 062976 A (Daiwa Handotai Sochi KK), Mar. 19, 1988.
European Abstract No. 9710532.0, Tadahiro Ohmi, et al.

* cited by examiner

*Primary Examiner*—Stephen M. Hepperle
(74) *Attorney, Agent, or Firm*—Armstrong, Westerman, Hattori, McLeland & Naughton, LLP

(57) ABSTRACT

A fluid control device has formed in a valve main body a main channel communicating with an inlet of a channel within a massflow controller, and a relatively long subchannel and a relatively short subchannel both communicating with the main channel. The process gas to be assure of high purity is passed through the relatively long subchannel.

1 Claim, 5 Drawing Sheets

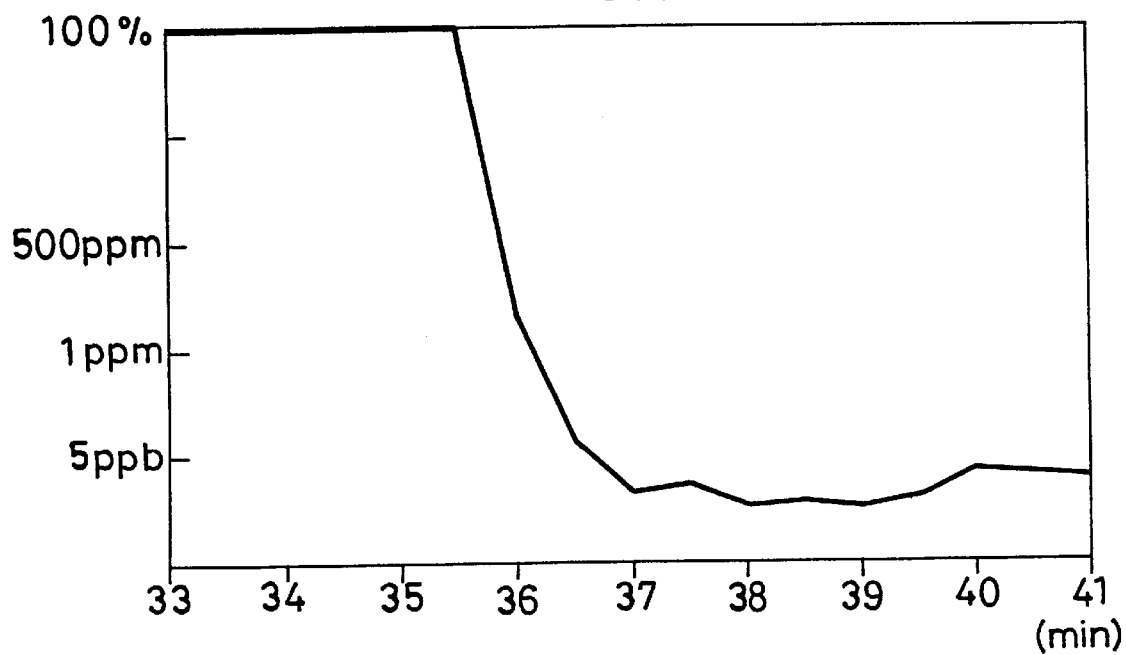
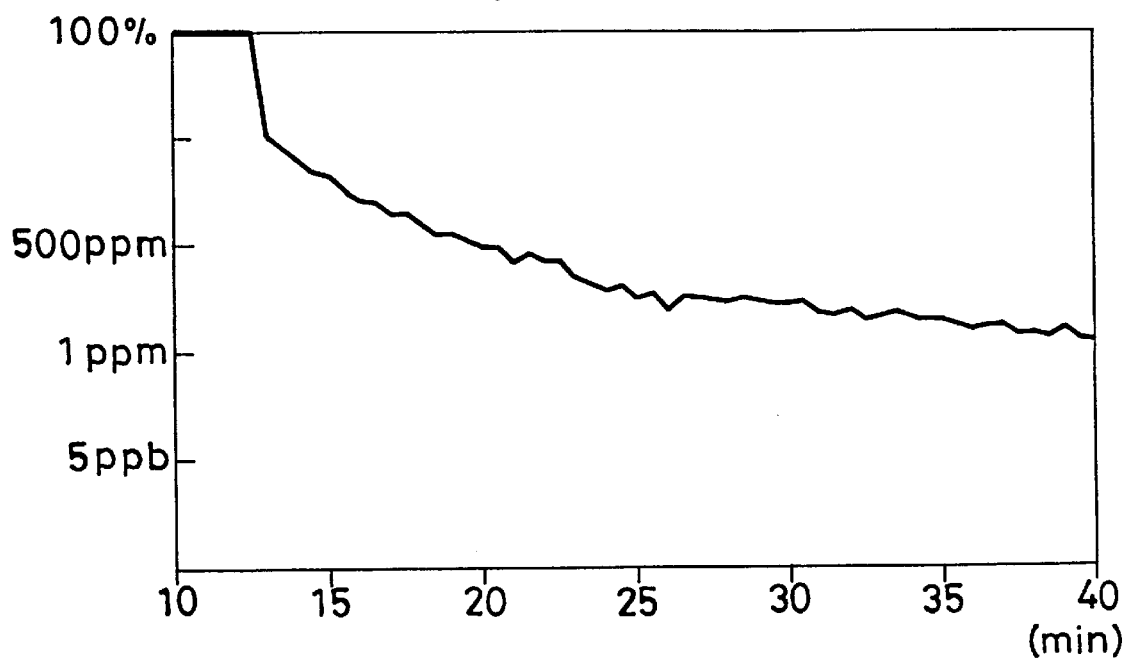

FLUID CONTROL DEVICE

This application is a continuation of 08/853,347 filed May 8, 1997 now U.S. Pat. No. 5,975,112.

BACKGROUND OF THE INVENTION

The present invention relates to fluid control devices, for example, for use in apparatus for producing semiconductors.

For example, FIG. 6 shows a fluid control device for use in apparatus for producing semiconductors. The device consists of a plurality of lines each comprising a massflow controller 31, two inlet on-off valves 32, 33 provided at the inlet side of the controller 31, and two or three outlet on-off valves 34, 35, 36 arranged at the outlet side of the controller. The inlet on-off valves 32, 33 are used for selectively supplying one of two kinds of gases, i.e., process gas A and purge gas B, while the outlet on-off valves 34, 35, 36 are provided for a line leading to a process chamber, a vent line and an evacuating line for a change-over from one line to another. Process gas A is a gas of which high purity is required and which is expensive. Such a fluid control device has channels for passing the gases A and B, i.e., a main channel 37 in communication with the inlet of a channel within the massflow controller 31, a relatively long subchannel 38 and a relatively short subchannel 39. Conventionally, the relatively short subchannel 39 is thought useful for passing process gas A to be assured of high purity in ensuring the purity of process gas A and reducing the amount thereof to be used.

Our research has revealed that the use of the relatively short subchannel for passing the process gas which should be held at high purity eventually fails to assure the process gas of its purity and to achieve a reduction in the amount of the gas to be used.

An object of the present invention is to provide a fluid control device which is optimized in ensuring the purity of the fluid, such as process gas, to be assured of high purity and in reducing the amount thereof to be used, by introducing the concept of a minimized dead volume (stagnant portion of fluid) in connection with the fluid of which high purity is required.

SUMMARY OF THE INVENTION

The present invention provides a fluid control device wherein a valve main body has formed therein a main channel communicating with an inlet or outlet of a channel within a controller for regulating the pressure or flow rate of fluids, and a relatively long subchannel and a relatively short subchannel both communicating with the main channel, one of the subchannels being serviceable for a fluid to be assured of high purity, the fluid control device being characterized in that the subchannel for passing therethrough the fluid to be assured of high purity is the relatively long subchannel.

The expression that "the subchannel for passing therethrough the fluid to be assured of high purity is the relatively long subchannel," when put in another way, can be expressed as the feature that the dead volume involved in passing the fluid to be assured of high purity is minimized.

The phrase a "relatively long subchannel" refers to the longer subchannel when the valve main body has two subchannels, or to the longest subchannel when the valve main body has three subchannels. When there are three subchannels, it is desired that the longer of the two remaining subchannels be used for a fluid which is the second in the order of importance of ensuring purity. With fluid control devices for use in producing semiconductors, the fluid to be assured of high purity is the process gas, and the fluid which is the second in the order of importance of ensuring purity is the purge gas.

The dead volume involved in passing the fluid to be assured of high purity is smaller in the fluid control device of the invention than in the conventional devices. This diminishes the reduction of purity occurring in starting to-pass the fluid of which high purity is required. Accordingly the present device produces optimized effects in ensuring the purity of the fluid to be assured of high purity and in reducing the amount of the fluid to be used.

BRIEF DESCRIPTION OF THE DRAWINGS

FIG. 3 is a graph for showing variations in the purity of process gas in the fluid control device of the invention;

FIG. 4 is a graph for showing variations in the purity of process gas in the conventional fluid control device;

DESCRIPTION OF THE PREFERRED EMBODIMENTS

Embodiments of the invention will be described below with reference to the drawings. The terms "upper" and "lower" as used in the following description are based on the illustration.

Figure 1:
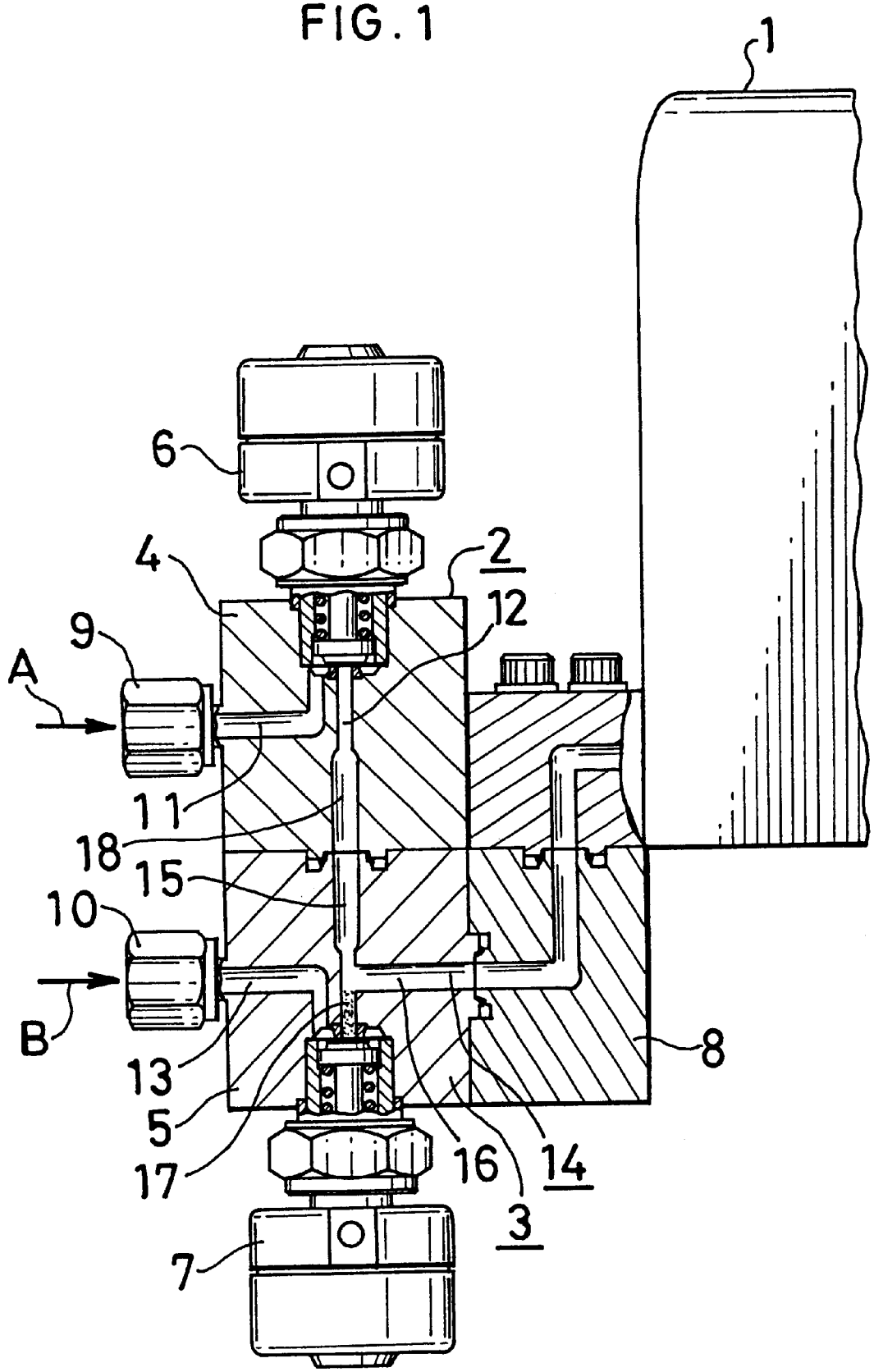
FIG. 1 is a front view showing a first embodiment of fluid control device of the invention.

FIG. 1 shows an embodiment of fluid control device of the present invention. Two on-off valves 2, 3 are provided at the inlet side of a massflow controller 1 and positioned one above the other as opposed to each other. The upper on-off valve 2 and the lower on-off valve 3 have their main bodies 4, 5 joined to each other. An actuator 6 for the upper on-off valve 2 is mounted on the top of the valve main body 4, while an actuator 7 for the lower on-off valve 3 is attached to the bottom of the valve main body 5. The main body 5 of the lower on-off valve 3 is joined to a channel block 8 provided at the inlet side of the massflow controller 1. The upper and lower valve main bodies 4, 5 are provided with inlet pipe joints 9, 10, respectively. The upper valve main body 4 is formed with an L-shaped inflow channel 11 and an I-shaped outflow channel 12. The outflow channel 12 is downwardly opened. The lower valve main body 5 is formed with an inverted L-shaped inflow channel 13 symmetric with the L-shaped inflow channel 11 of the upper valve main body 4, a reverse L-shaped outflow channel 14 generally symmetric with the inflow channel 13, and a bypass channel 15 holding the outflow channel 14 in communication with the outflow channel 12 of the upper valve main body 4. The reverse L-shaped outflow channel 14 of the lower valve main body 5 comprises a main channel 16 communicating with the controller 1 for regulating the pressure or flow rate of a fluid, and a subchannel 17 communicating with the main channel 16 and connected to the inflow channel 13 by the lower valve actuator 7. The main channel 16 is used not only as an outflow channel for the fluid to be admitted through the lower inlet pipe joint 10 but also as the outflow channel for the fluid to be admitted via the upper inlet pipe joint 9.

The fluid control device has a relatively long subchannel 18 comprising the outflow channel 12 of the upper valve main body 4 and the bypass channel 15 of the lower valve main body 5, and the subchannel 17 which is relatively short and which provides part of the outflow channel 14. Process gas A is passed through the relatively long subchannel 18, and purge gas B through the relatively short subchannel 17.

Figure 2:
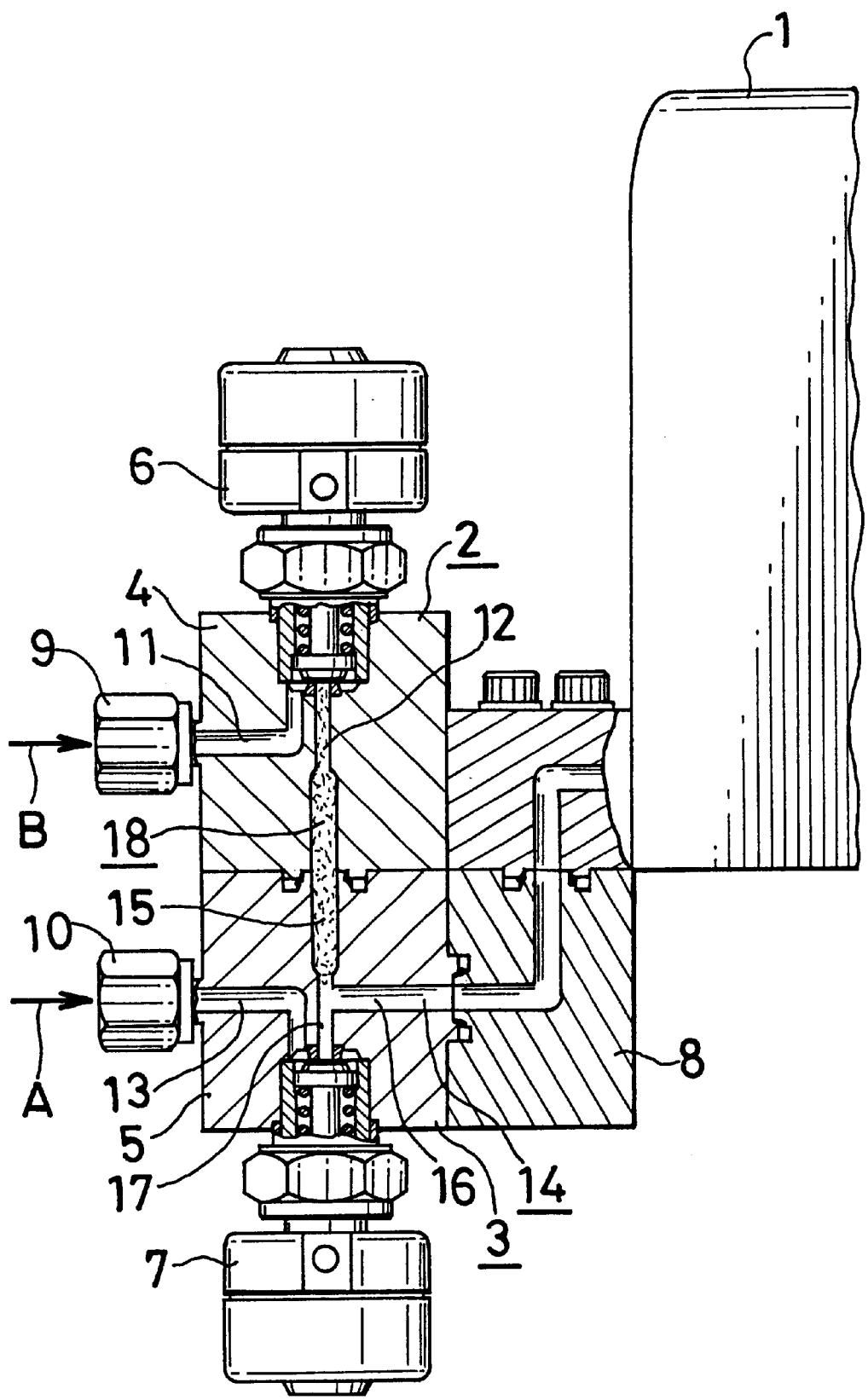
FIG. 2 is a front view of a conventional fluid control device.

The reason for using the relatively long subchannel 18 for passing process gas A will be described with reference to FIGS. 1 to 4. FIG. 2 shows a fluid control device which comprises the same components as in FIG. 1 and which differs from the device of FIG. 1 only in that purge gas B is passed through a relatively long subchannel 18, with process gas A passed through a relatively short subchannel 17.

With the fluid control device shown in FIG. 1, therefore, the dead volume involved in passing fluid A to be assured of high purity is only the portion of the relative short subchannel 17 indicated by dotting in FIG. 1. Conversely, if the relatively short subchannel 17 is used for passing the fluid to be assured of high purity as in the prior art, the dead volume involved in passing the fluid to be assured of high purity is the portion of the relatively long subchannel 18 indicated by dotting in FIG. 2. These drawings reveal that the device of the invention is much smaller than the prior-art device in dead volume.

FIG. 3 shows variations in the purity of process gas after the start of passage of the gas through the fluid control device of the invention shown in FIG. 1. More specifically, the purity of the process gas was determined by checking $N_2$, serving as a purge gas, for the reduction of concentration. The gas flow rate for testing was 20 c.c./min. With reference to the drawing, the concentration of $N_2$ decreased to 5 ppb, i.e., to a background level, during a replacement time of 90 seconds. This indicates that 90 seconds after the start of replacement, the purity of process gas reached a high level for use in the fabrication of semiconductors.

On the other hand, FIG. 4 shows variations in the purity of process gas after the start of passage of the gas through the conventional fluid control device shown in FIG. 2. The same method as above was used. With reference to the drawing, the replacement time was more than 1650 seconds, and the reduced concentration of $N_2$ still remained as high as 1 ppm even after the lapse of about 30 minutes. This indicates that the process gas of low purity must be used in the meantime or needs to be discarded.

In the above experiment, the dead volume was 0.05 c.c. in the device of FIG. 1 and 0.67 c.c. in the device of FIG. 2.

Two on-off valves are provided at the outlet side of the massflow controller 1 for a change-over from a line leading to a process chamber to a vent line and vice versa. Based on the same concept as above, a relatively long subchannel is used for the line leading to the process chamber.

Figure 5:
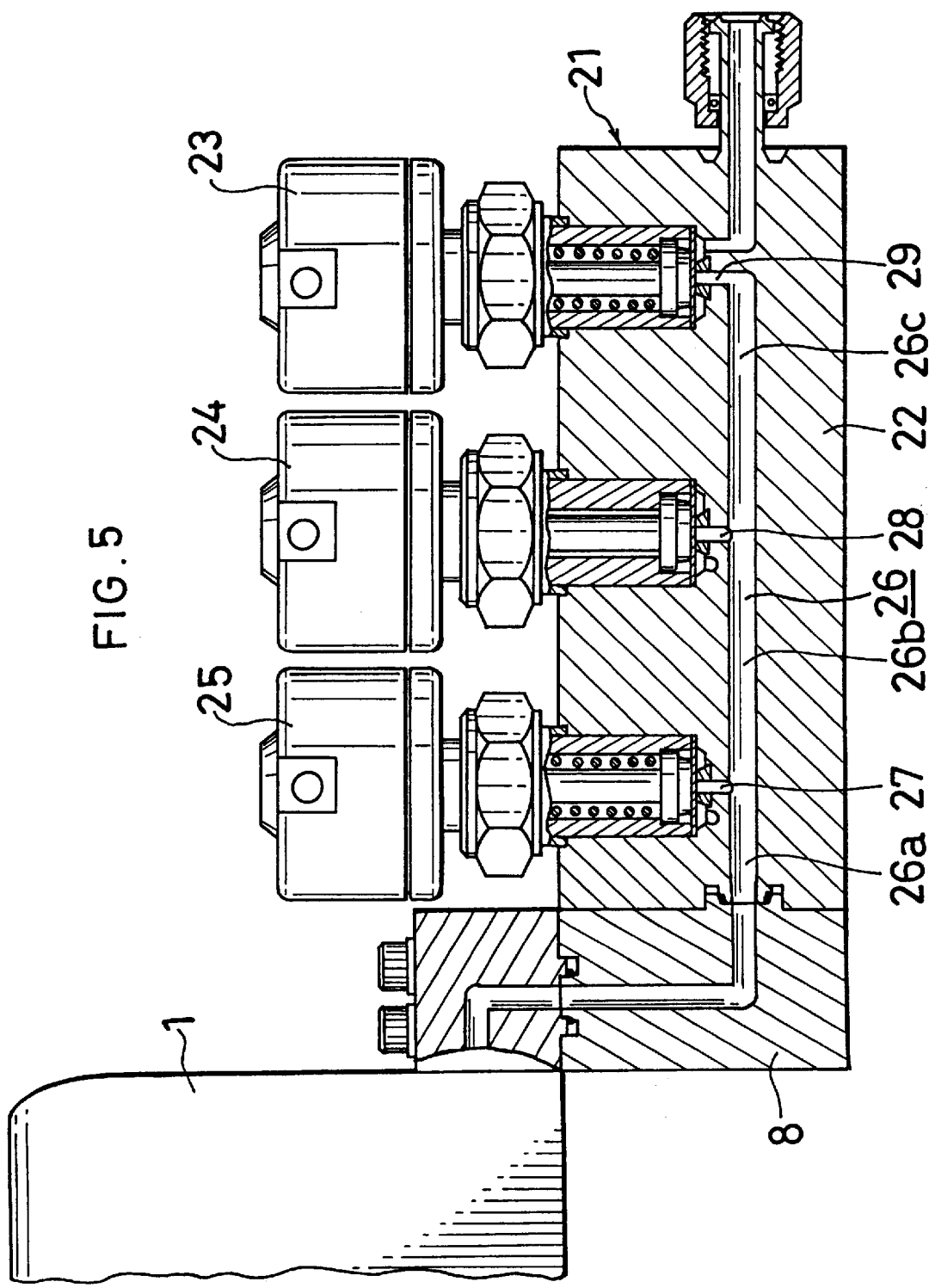
FIG. 5 is a front view showing a second embodiment of fluid control device of the invention.
Figure 6:
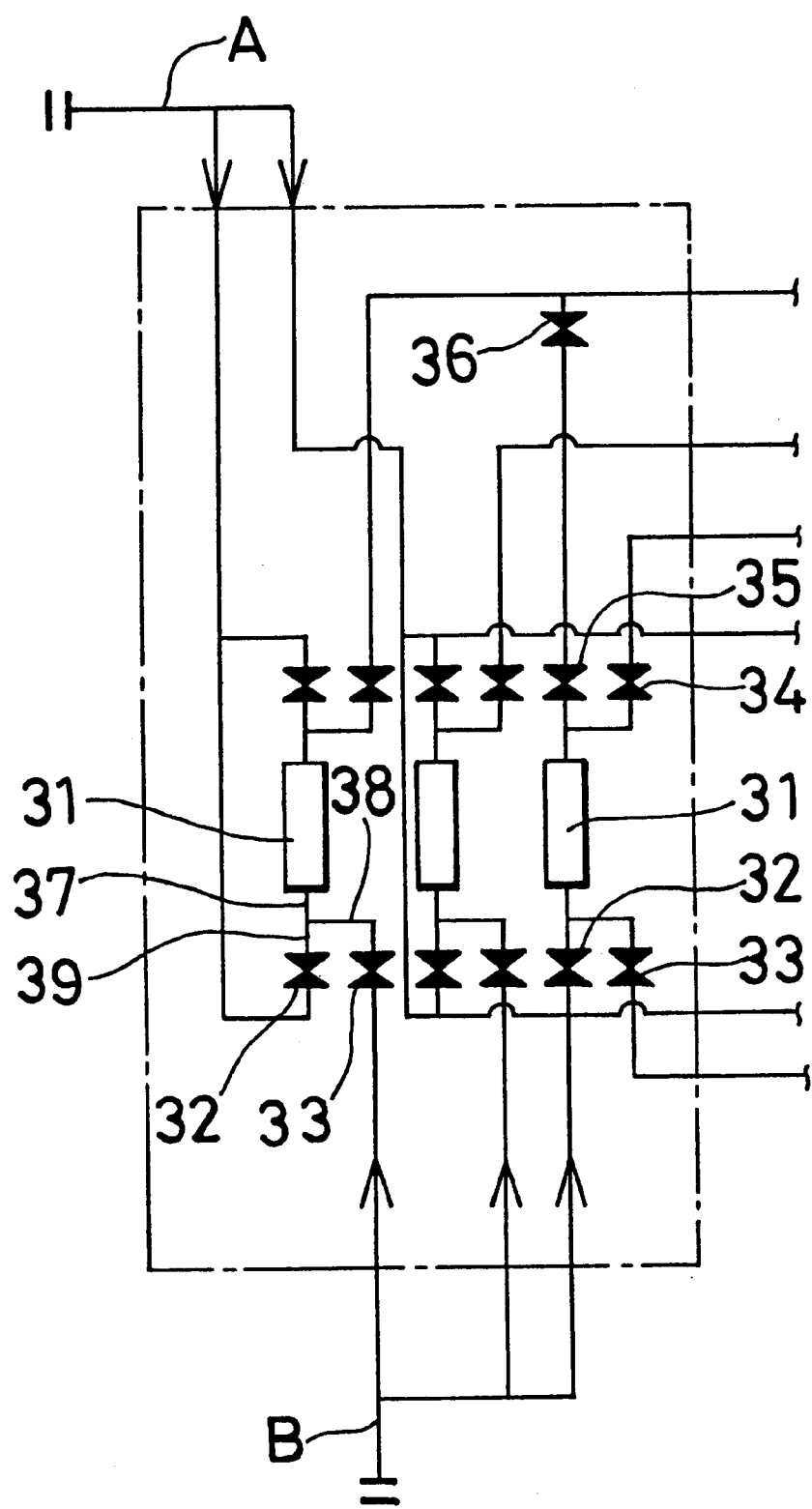
FIG. 6 is a diagram showing an application example of fluid control device with which the invention is concerned.

The combination of valve main bodies 4, 5 and actuators 6, 7 described is merely an example; such components are usable in a suitably altered combination. For example, the two valve main bodies 4, 5 may be combined into an integral body or arranged side by side instead of being positioned one above the other. The valve main bodies, as well as the valve actuators, may be three in number. FIG. 5 shows such an example.

With reference to FIG. 5, a massflow controller 1 is provided at the outlet side thereof with a valve device 21 comprising a valve main body 22 and three valve actuators 23, 24, 25. The valve main body 22 has formed therein a straight channel 26 extending straight from a channel in a channel block 8 disposed at the outlet side of the massflow controller 1. The straight channel 26 includes a portion extending from its end adjacent to the block 8 to the actuator 25 most proximate to the massflow controller 1 and serving as a main channel 26a. There are three subchannels. The shortest subchannel 27 is a portion extending from the main channel 26a to the actuator 25 most proximate to the controller 1. The subchannel 28, 26b of an intermediate length comprises a portion 26b included in the straight channel 26 and extending between the middle actuator 24 and the actuator 25 most proximate to the controller 1, and a portion 28 extending from the straight channel 26 to the middle actuator 24. The longest subchannel 29, 26c, 26b comprises a portion 26c, 26b included in the straight channel 26 and extending between the actuator 23 remotest from the controller 1 and the actuator 25 most proximate to the controller 1, and a channel 29 extending from the straight channel 26 to the actuator 23 remotest from the controller 1. The longest subchannel 29, 26c, 26b serves as a line leading to a process gas chamber, the subchannel 28, 26b of intermediate length as a vent line, and the shortest subchannel 27 as an evacuating line.

Accordingly, the dead volume of the line leading to the process gas chamber is the combination of the shortest subchannel 27 interconnecting the main channel 26a and the actuator 25 most proximate to the controller 1 and the portion 28 interconnecting the straight channel 26 and the middle actuator 24. The dead volume of the vent line is the combination of the shortest subchannel 27 interconnecting the main channel 26a and the actuator 25 most proximate to the controller 1, portion 26c included in the straight channel 26 and extending between the actuator 23 remotest from the controller 1 ,and the middle actuator 24 and the channel 29 interconnecting the straight channel 26 and the actuator 23 remotest from the controller 1. The dead volume of the evacuating line is the combination of the longest subchannel 29, 26c, 26b and the portion 28 interconnecting the straight channel 26 and the middle actuator 24.

The process gas chamber line provided by the longest subchannel 29, 26c, 26b with the smallest dead volume achieves optimized results in ensuring the purity of the process gas and reducing the amount of the gas to be used on the same principle as previously stated. Since the evacuating line is used for removing air to a vacuum, no problem whatever will arise even if the dead volume of the evacuating line is great. It is desired that the subchannel 28, 26b of intermediate length provide the vent line so as to reduce the dead volume of this line.

Although the foregoing embodiments are described for use with a gas for producing semiconductors, such devices have the same advantage as described above when used for applications other than production of semiconductors or when used for a liquid instead of gas. Briefly stated, the fluid control device comprises a valve main body having formed therein a main channel in communication With an inlet or outlet of a channel within a controller for regulating the pressure or flow rate of fluids, and a relatively long subchannel and a relatively short subchannel both communicating with the main channel, one of the subchannels being serviceable for the fluid to be assured of high purity. When the relatively long subchannel is used for passing this fluid, the device achieves optimized results in ensuring the high purity of the fluid and in reducing the amount of the fluid to be used. In the case where the device has three subchannels, the longest subchannel is used for the fluid which is the first in the order of importance of ensuring high purity, and the longer of the remaining two subchannels is used for another fluid which is the second in the order of importance.

What is claimed is:

1. A method for operating a fluid control device for alternatively passing a first fluid, which is the first in the order of importance of ensuring high purity, or second fluid, which is the second in the order of importance of ensuring higher purity, to a channel in a controller for regulating pressure or flow rate of fluids, said fluid control device including a valve main body having a main channel communicating with an inlet or an outlet of said channel in said controller, a first subchannel communicating with said main channel, and a second subchannel, which is shorter in length than said first subchannel, also communicating with said main channel, a first actuator for opening or closing said first subchannel to the passage of fluid and a second actuator for opening or closing said second subchannel to the passage of fluid alternative to the passage of fluid to said first subchannel, said method comprising the steps of:

opening said first subchannel and closing said second subchannel.

passing said first fluid through said first actuator and said first subchannel to said main channel without venting said main channels and said subchannels, the dead volume involved in passing said first fluid being the portion of the second subchannel, closing said first subchannel and opening said second subchannel, and passing said second fluid through said second actuator and said second subchannel to said main channel without venting said main channels and said subchannels the dead volume involved in passing said second fluid being the portion of the first subchannel.

* * * * *